(12) United States Patent
Fairbanks

(10) Patent No.: US 12,337,889 B1
(45) Date of Patent: Jun. 24, 2025

(54) STROLLER ORGANIZATIONAL SYSTEM FOR CARRYING ATHLETIC EQUIPMENT

(71) Applicant: Benjamin Cumber Fairbanks, Newport, MN (US)

(72) Inventor: Benjamin Cumber Fairbanks, Newport, MN (US)

( * ) Notice: Subject to any disclaimer, the term of this patent is extended or adjusted under 35 U.S.C. 154(b) by 0 days.

(21) Appl. No.: 18/120,411

(22) Filed: Mar. 12, 2023

Related U.S. Application Data

(60) Provisional application No. 63/319,306, filed on Mar. 12, 2022.

(51) Int. Cl.
 *B62B 5/00* (2006.01)
(52) U.S. Cl.
 CPC ...... *B62B 5/0016* (2013.01); *B62B 2202/404* (2013.01)
(58) Field of Classification Search
 CPC ............ B62B 9/26; B62B 1/262; B62B 3/102
 See application file for complete search history.

(56) References Cited

U.S. PATENT DOCUMENTS

| | | | | |
|---|---|---|---|---|
| 2,539,336 A | | 1/1951 | Sobers | |
| 2,590,154 A | * | 3/1952 | Burns | B62B 1/262 |
| | | | | 280/DIG. 6 |
| 2,761,691 A | * | 9/1956 | George | B62B 1/262 |
| | | | | 280/DIG. 6 |
| 3,154,314 A | * | 10/1964 | McCune, Jr. | B62B 1/262 |
| | | | | 280/DIG. 6 |
| 3,164,393 A | * | 1/1965 | Upham, II | B62B 1/262 |
| | | | | 280/DIG. 6 |
| 3,360,279 A | * | 12/1967 | Hunt | B62B 1/262 |
| | | | | 280/DIG. 6 |
| 3,738,677 A | * | 6/1973 | Renock | A63B 55/60 |
| | | | | 280/DIG. 6 |
| 3,827,613 A | | 8/1974 | Meyer | |
| 4,317,477 A | * | 3/1982 | Baptista | A63B 55/10 |
| | | | | 294/170 |
| 4,431,205 A | | 2/1984 | Speicher et al. | |
| 4,432,560 A | | 2/1984 | Patrick | |

(Continued)

FOREIGN PATENT DOCUMENTS

| | | |
|---|---|---|
| CA | 2614760 A1 | 5/2009 |
| SE | 1230081 A1 | 2/2014 |
| WO | 2022073070 A1 | 4/2022 |

*Primary Examiner* — Jeffrey J Restifo
(74) *Attorney, Agent, or Firm* — Lund IP, PLLC

(57) ABSTRACT

A stroller organizational system allows a user to carry athletic equipment including golf clubs, accessories, and personnel items with a stroller. In an example, an equipment carrying system includes a first upright member with a first slot formed proximate to an upper end of the first upright member, the first slot being configured to receive a first strap to secure the first upright member to a bar, a second upright member with a second slot formed proximate to an upper end of the second upright member, the second slot being configured to receive a second strap to secure the second upright member to the bar, and a lateral support member extending between the first upright member and the second upright member, the lateral support member including a series of protrusions extending upwards with spaces therebetween, each of the spaces being configured to support one side of elongated sporting equipment.

27 Claims, 16 Drawing Sheets

(56) References Cited

U.S. PATENT DOCUMENTS

| | | | | |
|---|---|---|---|---|
| 4,616,749 | A * | 10/1986 | Briggs | A63B 55/10 |
| | | | | 473/282 |
| 4,693,402 | A | 9/1987 | Comeau | |
| 4,830,238 | A * | 5/1989 | Widinski | B62B 9/26 |
| | | | | 224/563 |
| 4,848,504 | A | 7/1989 | Olson | |
| 4,856,744 | A * | 8/1989 | Frankel | B62J 7/08 |
| | | | | 224/558 |
| 4,874,055 | A | 10/1989 | Beer | |
| 4,881,746 | A * | 11/1989 | Andreesen | B62B 3/144 |
| | | | | 224/558 |
| 5,014,948 | A * | 5/1991 | Asaro | A47B 96/16 |
| | | | | 211/104 |
| 5,143,335 | A * | 9/1992 | Frankel | B62J 11/04 |
| | | | | 211/74 |
| 5,215,194 | A | 6/1993 | Blanford et al. | |
| 5,238,109 | A * | 8/1993 | Smith | A63B 55/10 |
| | | | | 206/315.6 |
| 5,244,175 | A * | 9/1993 | Frankel | A47G 23/0225 |
| | | | | 248/230.8 |
| 5,328,193 | A | 7/1994 | Shiew | |
| D350,426 | S | 9/1994 | Liao et al. | |
| 5,350,982 | A | 9/1994 | Seib | |
| 5,464,183 | A * | 11/1995 | McConnell | B62B 9/26 |
| | | | | 224/407 |
| 5,503,297 | A * | 4/1996 | Frankel | B62B 5/06 |
| | | | | 224/558 |
| 5,697,464 | A | 12/1997 | Gojak | |
| 5,702,039 | A * | 12/1997 | Olaiz | B62B 3/1456 |
| | | | | 24/3.13 |
| 5,704,527 | A * | 1/1998 | Struzer | B62B 9/26 |
| | | | | 224/558 |
| 5,725,095 | A | 3/1998 | Beck et al. | |
| D394,957 | S * | 6/1998 | Hsu | D3/320 |
| 5,829,656 | A * | 11/1998 | Reitz | B62J 11/00 |
| | | | | 294/154 |
| 5,836,486 | A * | 11/1998 | Ohsugi | A47G 25/32 |
| | | | | 211/113 |
| 5,899,284 | A | 5/1999 | Reimers et al. | |
| 5,941,437 | A * | 8/1999 | Okumura | A45F 3/02 |
| | | | | 224/586 |
| 6,168,174 | B1 * | 1/2001 | MacDougall | B62B 3/12 |
| | | | | 280/DIG. 6 |
| 6,260,865 | B1 * | 7/2001 | Yacobi | B62B 1/262 |
| | | | | 248/346.02 |
| 6,264,153 | B1 * | 7/2001 | Ragner | B62B 9/26 |
| | | | | 224/482 |
| 6,283,238 | B1 | 9/2001 | Royer et al. | |
| 6,308,840 | B1 * | 10/2001 | Mulholland | A63B 55/10 |
| | | | | 211/70.2 |
| 6,390,422 | B2 * | 5/2002 | Banko | B62B 9/26 |
| | | | | 211/113 |
| 6,629,601 | B1 | 10/2003 | Russell | |
| 6,640,970 | B1 | 11/2003 | Townsend, Jr. | |
| 6,766,930 | B2 * | 7/2004 | Dixon | B62B 9/26 |
| | | | | 224/572 |
| 6,942,238 | B1 | 9/2005 | DeCarlo | |
| 7,059,470 | B2 | 6/2006 | Slankster | |
| 7,077,274 | B2 | 7/2006 | Laud | |
| 7,086,491 | B2 | 8/2006 | Matte | |
| 7,137,644 | B2 | 11/2006 | Kimberley | |
| 7,284,659 | B2 | 10/2007 | Sugarek et al. | |
| 7,306,097 | B2 | 12/2007 | Wohlwender | |
| 7,621,548 | B2 | 11/2009 | Weber | |
| 7,740,135 | B2 | 6/2010 | Taylor | |
| D622,924 | S | 8/2010 | Liao | |
| 7,828,145 | B2 | 11/2010 | Grandér | |
| 7,862,053 | B2 | 1/2011 | Liao | |
| 7,866,685 | B2 | 1/2011 | Liao | |
| D634,091 | S | 3/2011 | Liao | |
| 7,913,840 | B2 | 3/2011 | Kealy | |
| D637,783 | S | 5/2011 | Liao | |
| 8,720,912 | B2 | 5/2014 | Liao | |
| 8,857,847 | B2 * | 10/2014 | Joubert | B62B 7/08 |
| | | | | 280/DIG. 6 |
| 8,936,183 | B2 * | 1/2015 | Zack | B62B 9/26 |
| | | | | 224/572 |
| 8,967,668 | B2 | 3/2015 | Bollmann | |
| 8,973,928 | B2 * | 3/2015 | Mellinger | B62B 9/26 |
| | | | | 280/47.35 |
| 9,399,479 | B1 * | 7/2016 | Chen | F16M 13/022 |
| 9,402,774 | B1 * | 8/2016 | Martin | A61G 5/1094 |
| 9,550,540 | B1 | 1/2017 | Wang | |
| 9,616,955 | B2 | 4/2017 | May | |
| 10,016,666 | B2 | 7/2018 | Reimers et al. | |
| 10,035,055 | B2 * | 7/2018 | Smith | B62B 3/12 |
| 10,189,529 | B1 | 1/2019 | Wang | |
| 10,450,027 | B2 | 10/2019 | Kistemaker et al. | |
| 10,654,507 | B2 * | 5/2020 | Perilli | B62B 5/067 |
| 11,358,042 | B2 | 6/2022 | Reimers et al. | |
| D966,156 | S * | 10/2022 | Perilli | D12/133 |
| 11,618,493 | B2 * | 4/2023 | Jackson | B62B 9/00 |
| | | | | 280/769 |
| 11,793,287 | B2 * | 10/2023 | Benezri | A45C 13/02 |
| 11,999,403 | B1 * | 6/2024 | Dewey | B62B 9/26 |
| 2006/0283904 | A1 * | 12/2006 | Dinslage | B62B 9/26 |
| | | | | 224/409 |
| 2012/0292480 | A1 * | 11/2012 | Burley | B62B 9/26 |
| | | | | 248/674 |
| 2013/0048685 | A1 | 2/2013 | Durkos | |
| 2013/0234418 | A1 | 9/2013 | Reimers et al. | |
| 2015/0251681 | A1 * | 9/2015 | Castillo | B62B 9/26 |
| | | | | 108/27 |
| 2017/0296890 | A1 | 10/2017 | Maguire et al. | |
| 2018/0128572 | A1 * | 5/2018 | Carter | F41C 33/06 |
| 2018/0283710 | A1 * | 10/2018 | French | A01D 34/001 |
| 2021/0076794 | A1 | 3/2021 | Benezri | |
| 2022/0305357 | A1 | 9/2022 | Reimers et al. | |
| 2023/0249040 | A1 * | 8/2023 | Bender | A63B 55/10 |
| | | | | 224/409 |
| 2024/0009529 | A1 * | 1/2024 | Luffman | A63B 55/40 |

\* cited by examiner

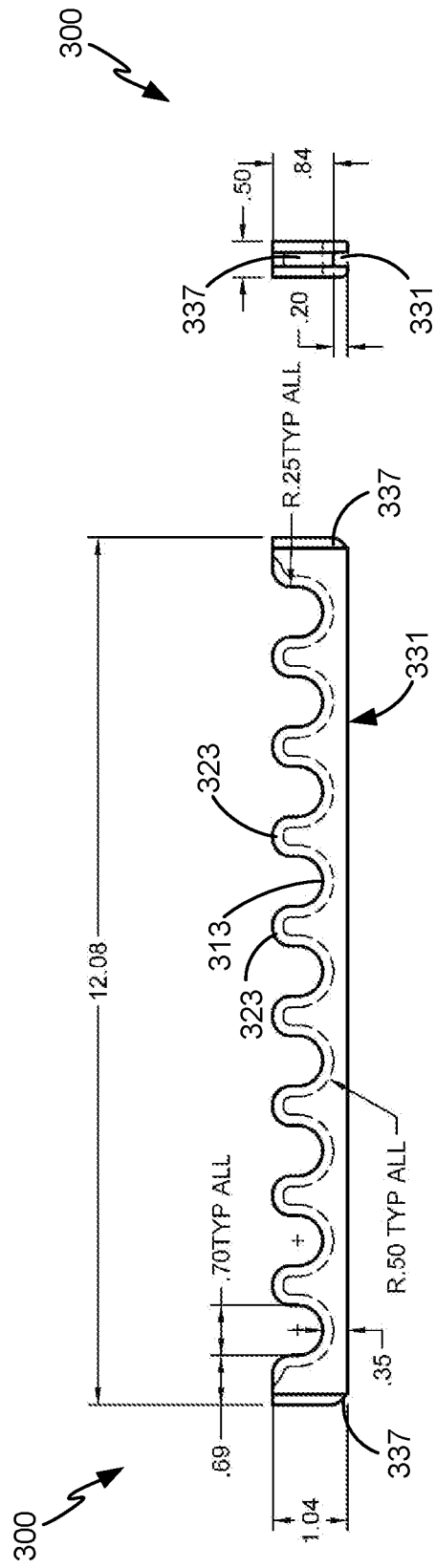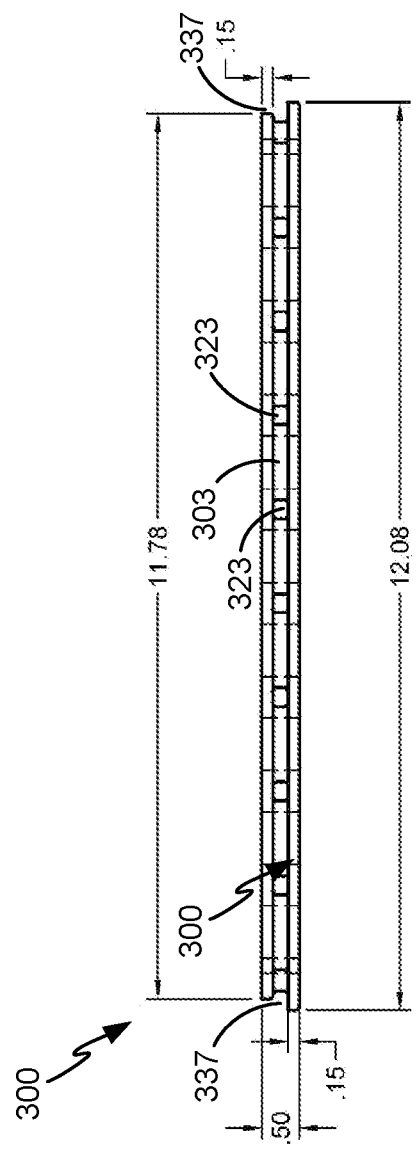
FIG. 3C
FIG. 3B
FIG. 3D

STROLLER ORGANIZATIONAL SYSTEM FOR CARRYING ATHLETIC EQUIPMENT

CROSS REFERENCE TO RELATED APPLICATION

This application claims the benefit of U.S. Provisional Patent Application No. 63/319,306, titled STROLLER ORGANIZATIONAL SYSTEM FOR CARRYING ATHLETIC EQUIPMENT, filed Mar. 12, 2022, the entire contents of which are incorporated by reference herein.

TECHNICAL FIELD

This disclosure relates to stroller accessories.

BRIEF SUMMARY

A stroller organizational system for carrying athletic equipment combines with a stroller's built-in features like handlebars, support bars, and under carriage to carry athletic equipment. The system allows a user to carry athletic equipment including golf clubs, accessories, and personnel items by attaching the system to a stroller. This allows a user to carry their athletic equipment and a young child in the stroller for a trip to the golf course.

In one example, an equipment carrying system includes an upright member, one or more hooks coupled to an upper portion of the upright member, the one or more hooks being configured to hang over a horizontal bar, such as a stroller handle, a lateral support member extending from the upright member below the hooks, the lateral support member including a series of protrusions extending towards the hooks with spaces therebetween, each of the spaces being configured to support one side of individual items of a set of elongated sporting equipment.

In another example, an equipment carrying system includes a first upright member with a first slot formed proximate to an upper end of the first upright member, the first slot being configured to receive a first strap to secure the first upright member to a bar, a second upright member with a second slot formed proximate to an upper end of the second upright member, the second slot being configured to receive a second strap to secure the second upright member to the bar, and a lateral support member extending between the first upright member and the second upright member, the lateral support member including a series of protrusions extending upwards with spaces therebetween, each of the spaces being configured to support one side of individual items of a set of elongated sporting equipment.

In a further example, an assembly includes a stroller including: a stroller frame with wheels, a generally horizontal stroller handle connected to the stroller frame, a child seat suspended from the stroller frame, and an open storage compartment suspended from the stroller frame below the child seat. The assembly further includes an equipment carrying system including: an upright member, one or more hooks coupled to an upper portion of the upright member, and a lateral support member extending from the upright member below the hooks, the lateral support member including a series of protrusions extending towards the hooks with spaces therebetween, each of the spaces being configured to support one side of individual items of a set of elongated sporting equipment. The one or more hooks are hooked over the stroller handle such that the equipment carrying system hangs from the stroller handle.

BRIEF DESCRIPTION OF THE DRAWINGS

FIGS. 3A-3D illustrate an optional foam protector for the equipment carrying system of FIGS. 1A-1C.

DETAILED DESCRIPTION

Figure 1A:
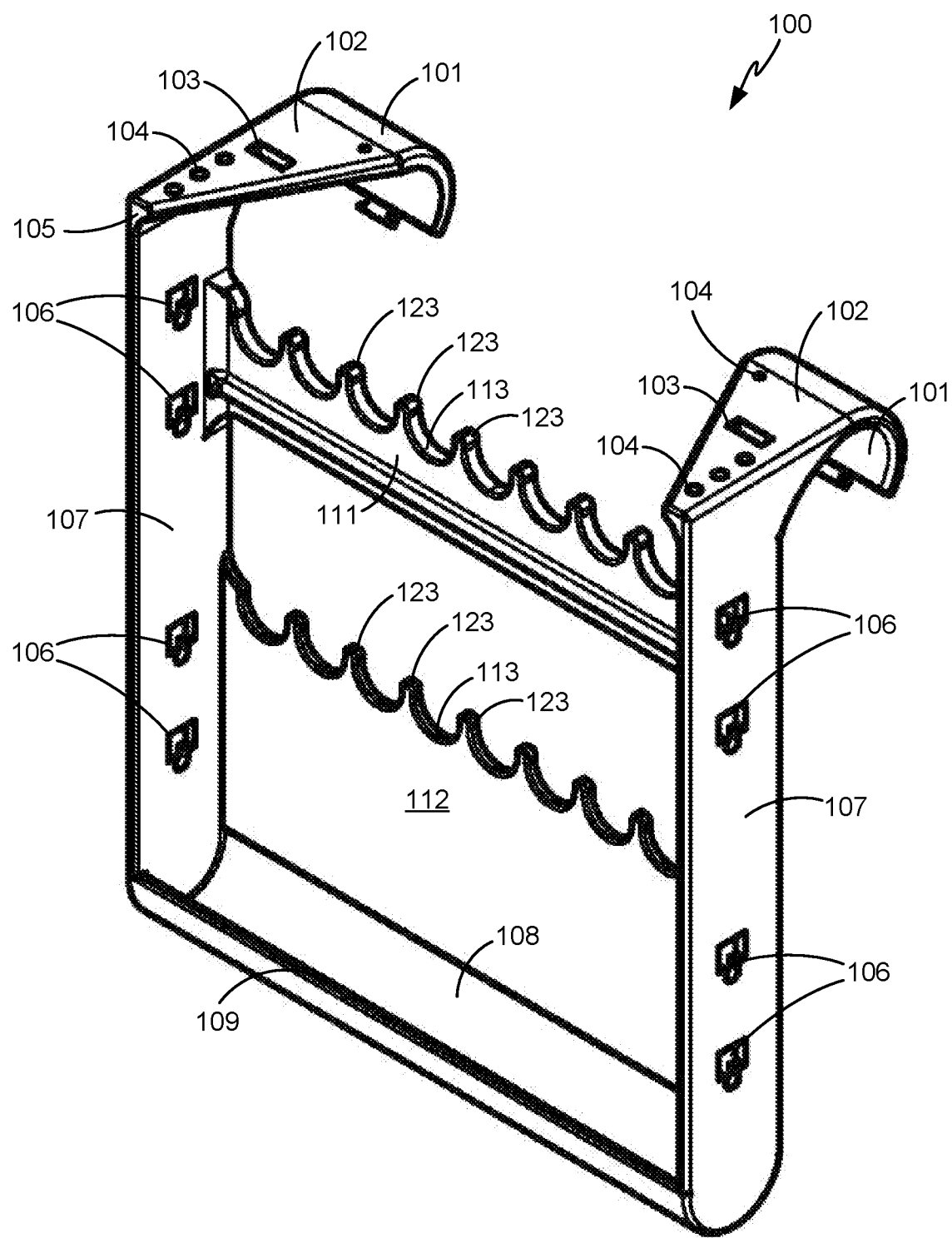
FIGS. 1A-1C illustrate an equipment carrying system that allows a user to carry athletic equipment including golf clubs, accessories, and personnel items by attaching the system to a stroller.
Figure 1B:
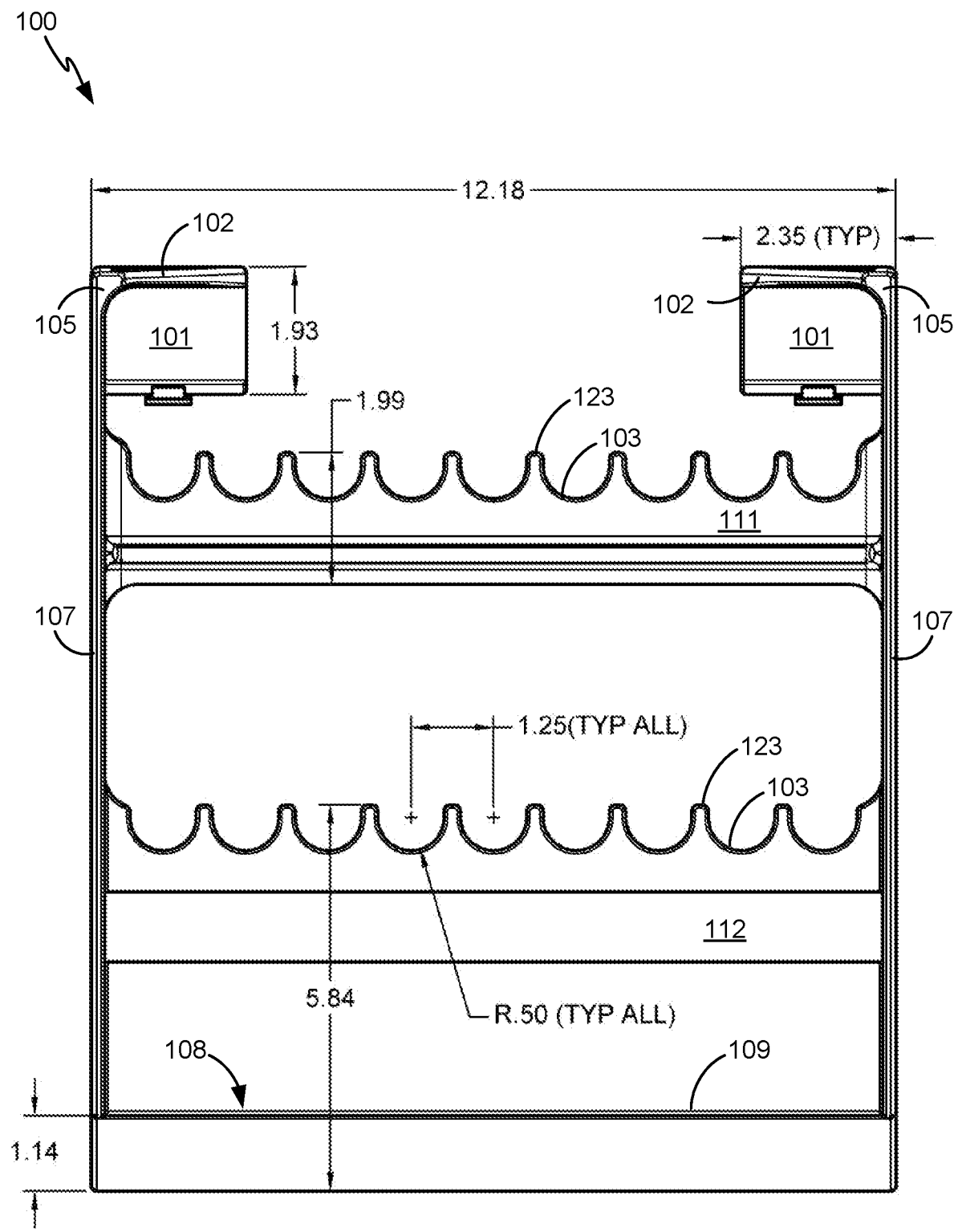
Figure 1C:
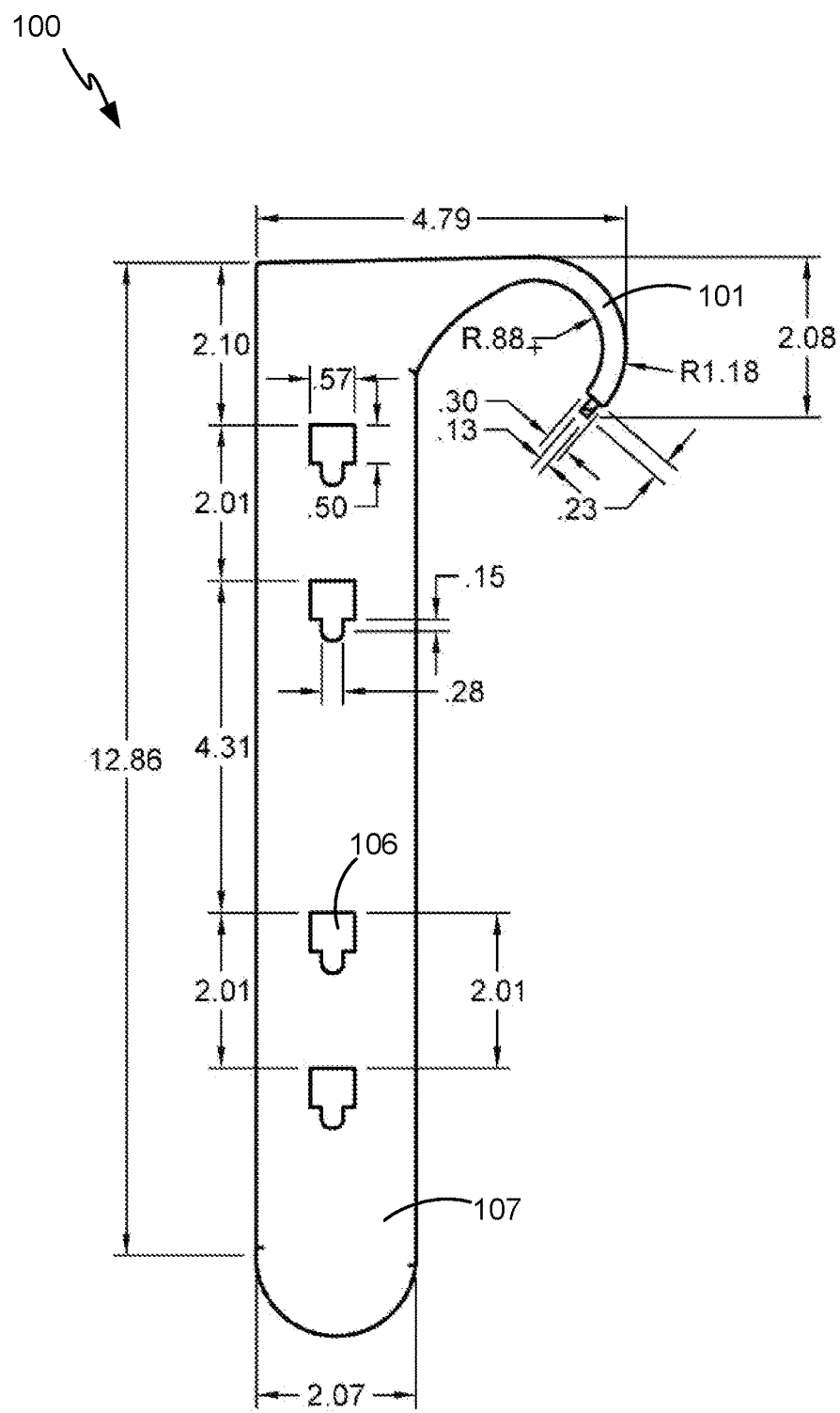
Figure 2:
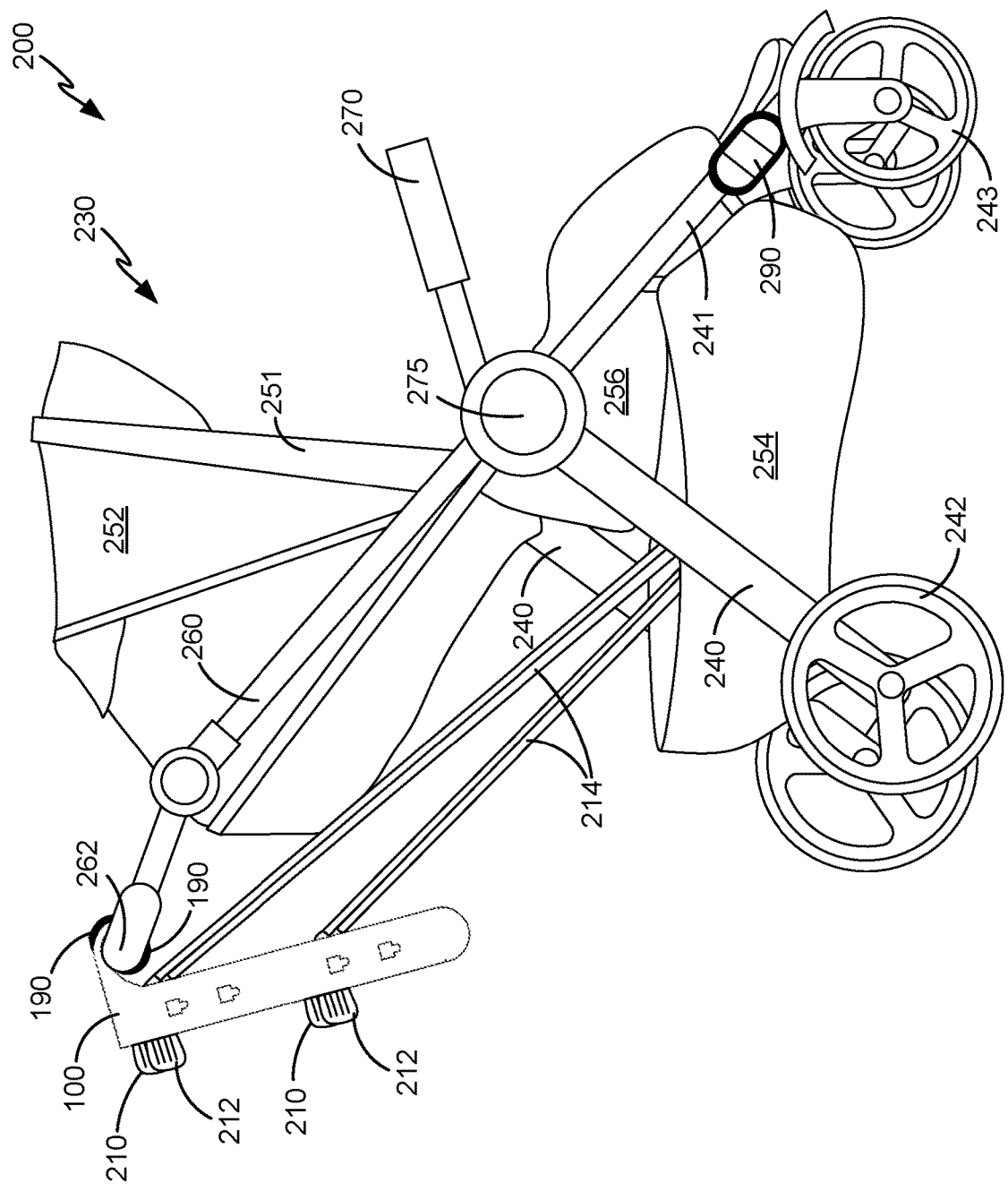
FIG. 2 illustrates an assembly including the equipment carrying system of FIGS. 1A-1C mounted on a stroller and supporting a set of athletic equipment.

FIGS. 1A-1C illustrate an equipment carrying system 100. FIG. 2 illustrates an assembly 200 including the equipment carrying system 100 mounted on a stroller 230 and supporting a set of golf clubs 210. Equipment carrying system 100 attaches to stroller 230 to carry athletic equipment, such as golf clubs 210, accessories, and personnel items. Hooks 101 of equipment carrying system 100 combine with straps 190 to secure the system 100 to the handle 262 of stroller 230. Specifically, FIG. 1A illustrates an isometric view, FIG. 1B illustrates a front view, and FIG. 1C illustrates a side view of system 100.

Equipment carrying system 100 includes two upright members 107 with hooks 101 coupled to an upper portion of each of the upright members 107. The hooks 101 are configured to hang over a horizontal bar, such as a stroller handle 262 (FIG. 2) or other stroller frame element. As used herein, terms used to describe directions and orientations, including "width," "lateral," and "upright" are relative to other components, and do not represent a required orientation of the device or precise angles of individual elements.

Equipment carrying system 100 further includes lateral support members 111, 112 extending between the upright members 107 below the hooks 101. Each lateral support member 111, 112 includes a series of protrusions 123 extending towards the hooks 101 with spaces 113 therebetween, each of the spaces 113 being configured to support one side of individual items of a set of elongated sporting equipment, such as golf clubs 210 (FIG. 2). The number of individual item spaces 113 and their size can vary dependent on width of the system 100 and the sports equipment to be carried. As an example, this system 100 has been tested with nine individual item spaces 113 on each of lateral support members 111, 112. Other examples may include as few as a single space on each of lateral support members 111, 112 to over 60 spaces on each of lateral support members 111, 112.

The equipment carrying system 100 further includes an optional elongated element 108 below the lateral support members 111, 112 forming a channel sized to receive golf balls, with an open side of the channel facing toward the lateral support members 111, 112. The elongated element includes a snap-in ridge 109 on an upper edge of the channel to releasably constrain golf balls within the channel. The number of golf balls that can be carried will vary dependent on width of the system 100. An example system 100 has been tested with seven golf balls. Other examples may carry zero to over 40 golf balls. In addition, while elongated element 108 is at the bottom of the upright members 107, in other examples, elongated element 108 may be at the top of the upright members 107 to allow easier access to the golf balls or other items stored within. In the same or different example, a system 100 may include more than one optional elongated element 108 between the lateral support members 111, 112 forming a channel sized to receive golf balls, or other sports equipment or personal items.

The upright members 107 extend between the elongated element 108, the lateral support members 111, 112, and carriers 102. The upright members 107 are shaped as generally planar elongated members. The ends of lateral support members 111, 112 and elongated element 108 intersect with a planar surfaces of the two upright members 107. The upright members 107 provide resistance to movement as the system 100 shifts during use on uneven surfaces and will help to carry the load dispersed onto the lateral support members 111, 112 that will be supporting the weight of the elongated sports equipment.

While equipment carrying system 100 includes two upright members 107, other examples may include a single upright member 107, with one or more lateral support member 111, 112 extending outwardly on either side of the single upright member 107. Likewise, while equipment carrying system 100 includes two lateral support members 111, 112, other examples may include a single lateral support member 111, 112, or more than two lateral support members 111, 112, such as three or four lateral support members 111, 112 stacked on top of one another between two upright members 107.

The equipment carrying system 100 further includes carriers 102 extending laterally from each upright member 107 and coupling the adjacent hook 101 to the upright member 107. Each hook 101 connects to the top portion of the carrier 102 to add depth and support to the system 100. The carriers 102 are shaped as generally planar elongated members. Sidewall supports 105 connect to edges of the carriers 102 and the upright member 107 to provide rigidity and strength between the components.

Carriers 102 further form slots 103, with a width of the slots generally in alignment with a width of the lateral support members 111, 112. Slots 103 are configured to receive straps 190 to wrap around handle 262 of stroller 230 and secure the system 100 to the stroller 230. In some examples, straps 190 may be used without first hanging the system with hooks 101. Use of only straps 190 provides additional clearance between handle 262 of stroller 230 and lateral support member 111 and also facilitates mounting system 100 to alternative supports other than horizontal bars like handle 262 of stroller 230. The system 100 is not limited to using the straps 190 and hooks 101 to secure it to the stroller. It can also be secured by products similar in nature to clamps, rope, string, zip ties, ratchet systems, tape, and adhesives. Other alternatives may simply include straps without hooks, such as straps 190 extending through slots in the two upright members 107.

In the example of equipment carrying system 100, upright members 107 each form two sets of accessory notches 106. Other examples may include no accessory notches 106 or as many as ten or more accessory notches 106 per side if room allows. Each set of accessory notches 106 includes two through-holes spaced apart from one another in vertical alignment on the upright member 107. The accessory notches 106 are configured to receive mating productions of an accessory, such as one of accessories 400, 500, 600, 700, 800, 900. Such accessories may include a cup holder, a set of tubes configured to receive junior sporting equipment, a magnetic holder, scorecard clip, a phone clip, a wallet holder, a towel ring and/or other accessories. In the example of equipment carrying system 100, carriers 102 also include through holes 104, which are sized to receive golf tees and/or ball markers in an interference fit.

FIGS. 1B and 1C include size dimensions in inches of one example, although size may vary considerably, such as between 50 to 200 percent of the dimensions shown on FIGS. 1B and 1C. Size dimensions of system 100 allow use on varying stroller sizes. An example size of the system 100 could include 14.5 inches tall by 12.5 inches wide, with a depth of 4.5 inches at the top hooks 101 and 2 inches at the base of element 108. Other examples could extend beyond a range of 4 inches to 60 inches in width and 2 inches to 36 inches tall. In the event of width and height restraints the lateral support members 111, 112 would be adjusted based on available space.

In some example, the equipment carrying system 100 including the upright members 107, the one or more hooks 101, and the lateral support members 111, 112 is a unitary component, such as an injection molded polymer or 3D printed component formed from a single mold. In other examples, system 100 can be manufactured in multiple sections and then fastened using connectors. Likewise, any of accessories 400, 500, 600, 700, 800, 900 may be a unitary component, such as an injection molded polymer or 3D printed component.

In the same or different examples, the equipment carrying system 100 and/or any of accessories 400, 500, 600, 700, 800, 900 may be formed from a polymer material, such as, but not limited to a polyethylene terephthalate glycol, an acrylonitrile butadiene styrene (ABS), or a polycarbonate. In other examples, the equipment carrying system 100 and/or any of accessories 400, 500, 600, 700, 800, 900 may be formed from wood, a composite material, such as a fiberglass or carbon fiber material, or a metal material, such as steel, aluminum, or an aluminum alloy.

As shown in FIG. 2, assembly 200 includes a stroller 230 and an equipment carrying system 100 with hooks 101 are hooked over the stroller handle 262 or any support area of the stroller 230 such that the equipment carrying system 100 hangs from the stroller handle 262. The hooks 101 are 2 inches wide in one example but can vary in size for stability and comfort. Other examples may include a single hook extending the full width of system 100.

Once the system 100 has been fastened to the stroller 230 the user can store athletic equipment, for example but not limited to golf clubs, hockey sticks, lacrosse, croquet mallets, and hunting equipment. The system 100 is setup and aligned to allow access to the under storage of the stroller 230 where the equipment can have one side placed on one of the lateral support members 111, 112 to support the weight, while the other side rests on the open storage compartment 254 of stroller 230.

Stroller 230 is a commercially available stroller unmodified other than the addition of the equipment carrying system 100. Details regarding the stroller 230 are provided for context, although equipment carrying system 100 may be used with any variety of strollers or other equipment including a generally horizontal bar suitable for hanging the equipment carrying system 100. In other examples, hooks 101 may be modified to attach to other elements. For example, hooks 101 receive stroller handle 262 about a width of the system 100. Other strollers include two handles would extend transverse to the width of the system 100. A modified version of system 100 may include hooks turned 90 degrees to hang from two parallel elements, such as two stroller handles.

Stroller 230 includes a collapsible stroller frame including back legs 240 with wheels 242 and front legs 241 with wheels 243. The stroller frame further includes a handlebar support 260 extending between legs 240, 241 and generally horizontal stroller handle 262 connected to the stroller frame. Collapsible cover 252 is supported by cover arm 251 extending from the handlebar support 260. A child seat 256 is suspended from the stroller frame, and an open storage compartment 254 suspended from the stroller frame below the child seat. Front safety bar 270 protects the child seat area in event of a tipover. The stroller frame is collapsible about pivot 275.

Assembly 200 includes a set of golf clubs 210, representing individual items of a set of elongated sporting equipment. Each golf club 210 includes an end 212 supported by the spaces 113 of the lateral support members 111, 112. In this example, ends 212 are the club head ends. The other end of each golf club 210, the handle end of the shaft 214, is supported by the open storage compartment 254. The individual spaces 113 keep golf clubs 210 in place while moving stroller 230. In this manner, equipment carrying system 100 combines with stroller to stroller 230 to carry the golf clubs 210 without impacting the functionality of stroller 230.

Assembly 200 further includes an optional counterweight 290 attached to the stroller frame opposite the stroller handle, at a front leg 241. Counterweight 290 serves to help balance the weight of the golf clubs 210 to keep stroller 230 from tipping backwards. While the counterweight 290 may take any form, in this example, the counterweight 290 includes a mass of at least 1 pound and a releasable strap engaging the stroller frame. Such a strap may include hook and loop fasteners to facilitate securing the counterweight 290 to the stroller frame. Other techniques of attaching the counterweight may also be used, such as clamps. In the same or different examples, more than one counterweight may be used.

Figure 3A:
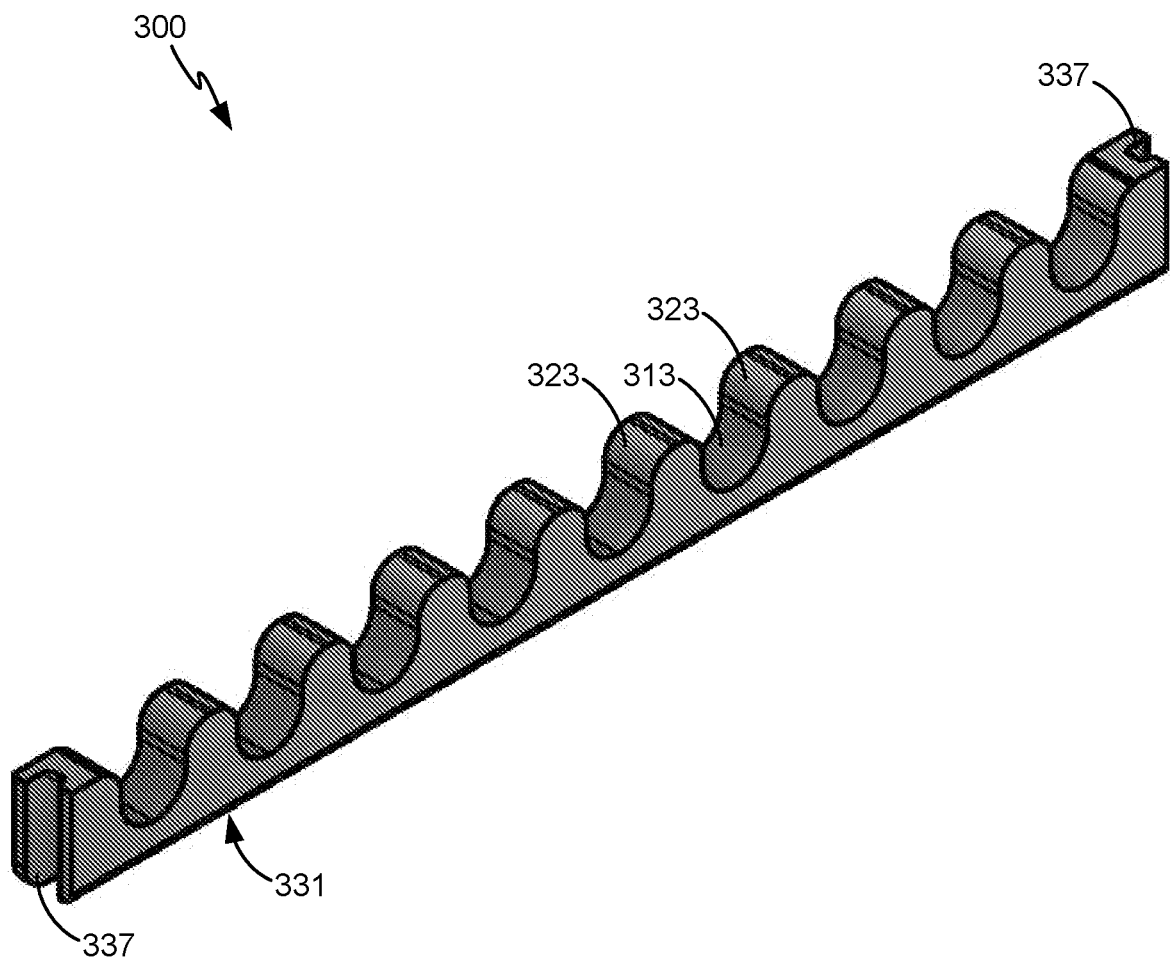

FIGS. 3A-3D illustrate an optional foam protector 300 for the equipment carrying system 100. Specifically, FIG. 3A illustrates an isometric view, FIG. 3B illustrates a front view, and FIG. 3C illustrates a side view, and FIG. 3D illustrates a top view of foam protector 300.

Foam protector 300 fits over one of the lateral support members 111, 112 to protect the athletic equipment. An upper surface of foam protector 300 includes a series of protrusions 323 with spaces 313 therebetween corresponding to the protrusions 123 and spaces 113 of the lateral support members 111, 112. Foam protector 300 further includes a bottom groove 331 configured to mate with a series of protrusions 123 of the lateral support members 111, 112 and side grooves 337 to mate with the edges of the lateral support members 111, 112.

FIGS. 3B-3D include size dimensions in inches of one example, although size may vary considerably, such as between 50 to 200 percent of the dimensions shown on FIGS. 3B-3D. The sizes are adjusted to conform to the system 100.

Figure 4A:
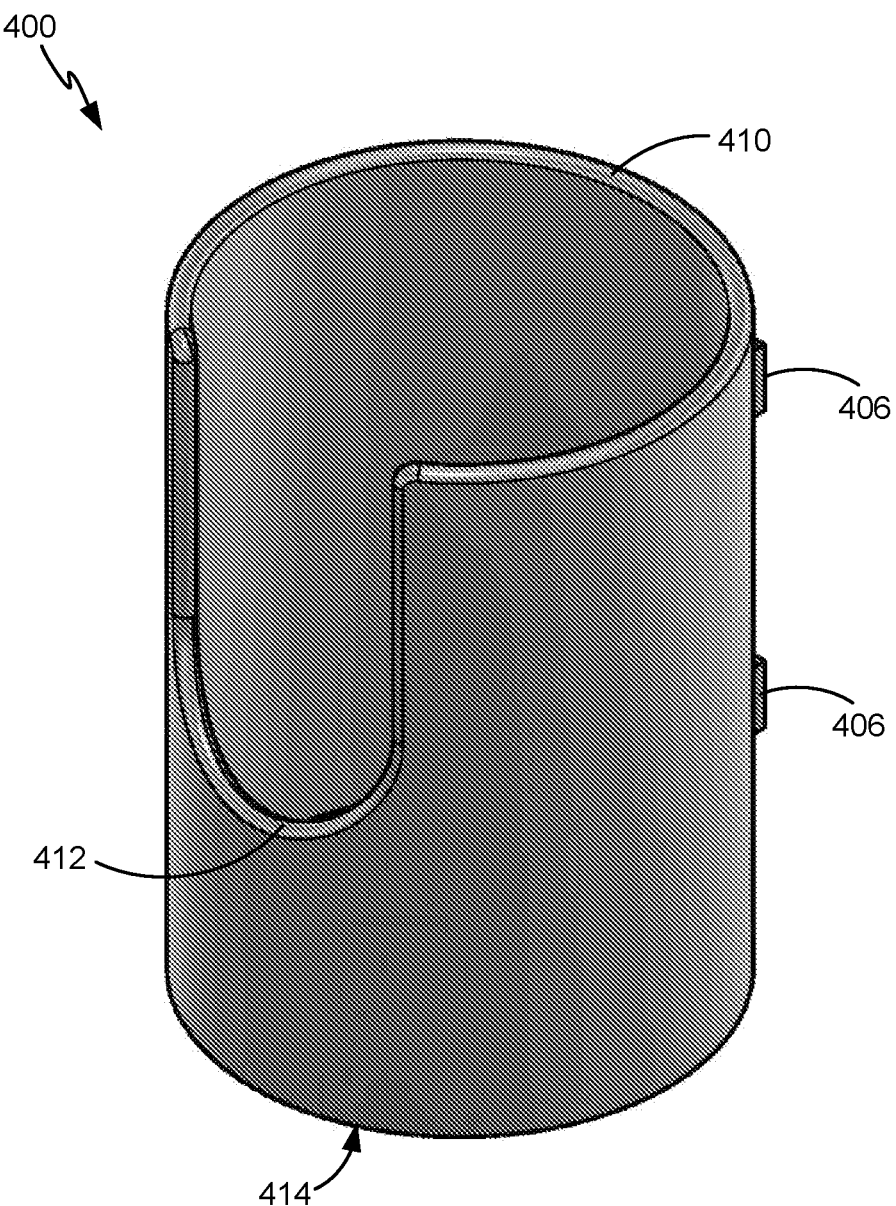
FIGS. 4A-4D illustrate an optional cup holder accessory for the equipment carrying system of FIGS. 1A-1C.
Figures 4B, 4C:
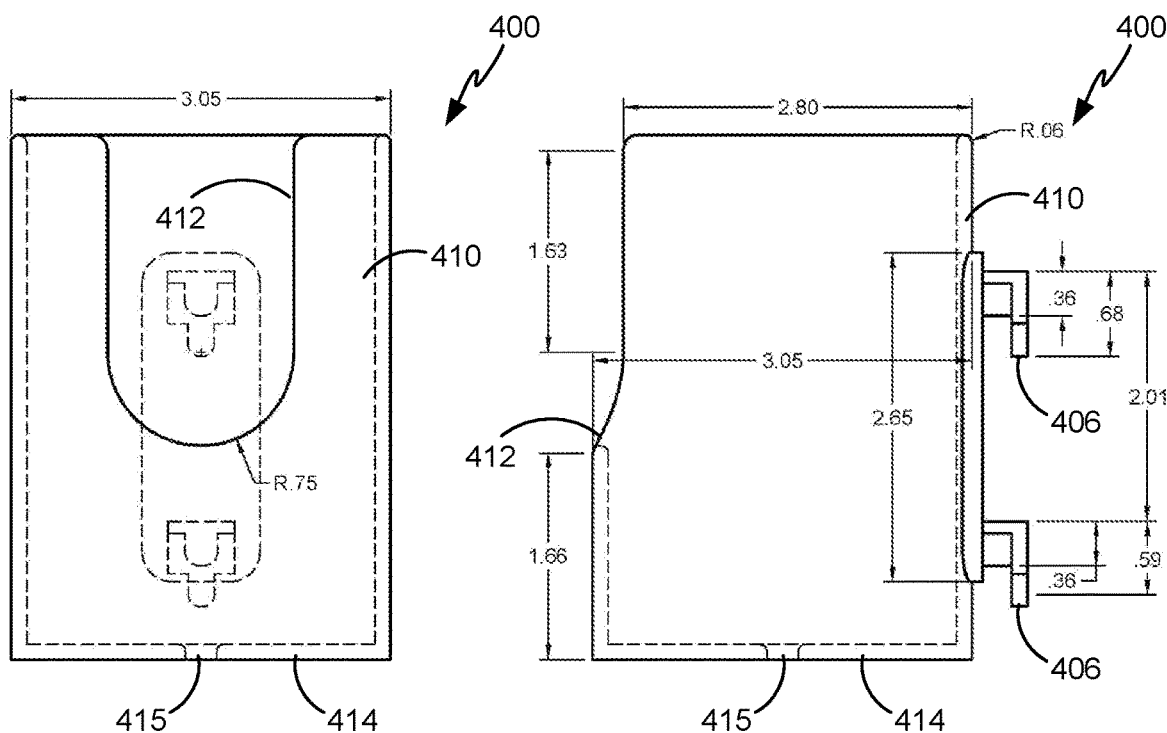
Figure 4D:
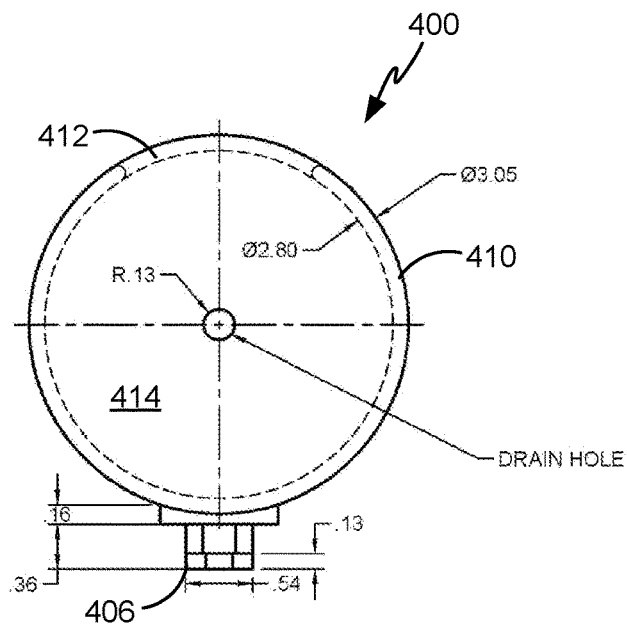

FIGS. 4A-4D illustrate an optional cup holder accessory 400 for the equipment carrying system 100. Specifically, FIG. 4A illustrates an isometric view, FIG. 4B illustrates a front view, and FIG. 4C illustrates a side view, and FIG. 4D illustrates a bottom view of cup holder 400.

Cup holder 400 is a cylindrical configuration with an open top, cylindrical sidewalls 410, with cup handle notch 412 and a bottom surface 414 with a drain hole 415. Mating protrusions 406 are configured to engage a set of accessory notches 106 of system 100, allowing a user to mount cup holder 400 to upright members 107 of system 100.

FIGS. 4B-4D include size dimensions in inches of one example, although size may vary considerably, such as between 50 to 200 percent of the dimensions shown on FIGS. 4B-4D. The sizes are adjusted to conform to the system 100, and to fit a suitable beverage container, such as a 12 ounce beverage can and/or mug.

Figure 5A:
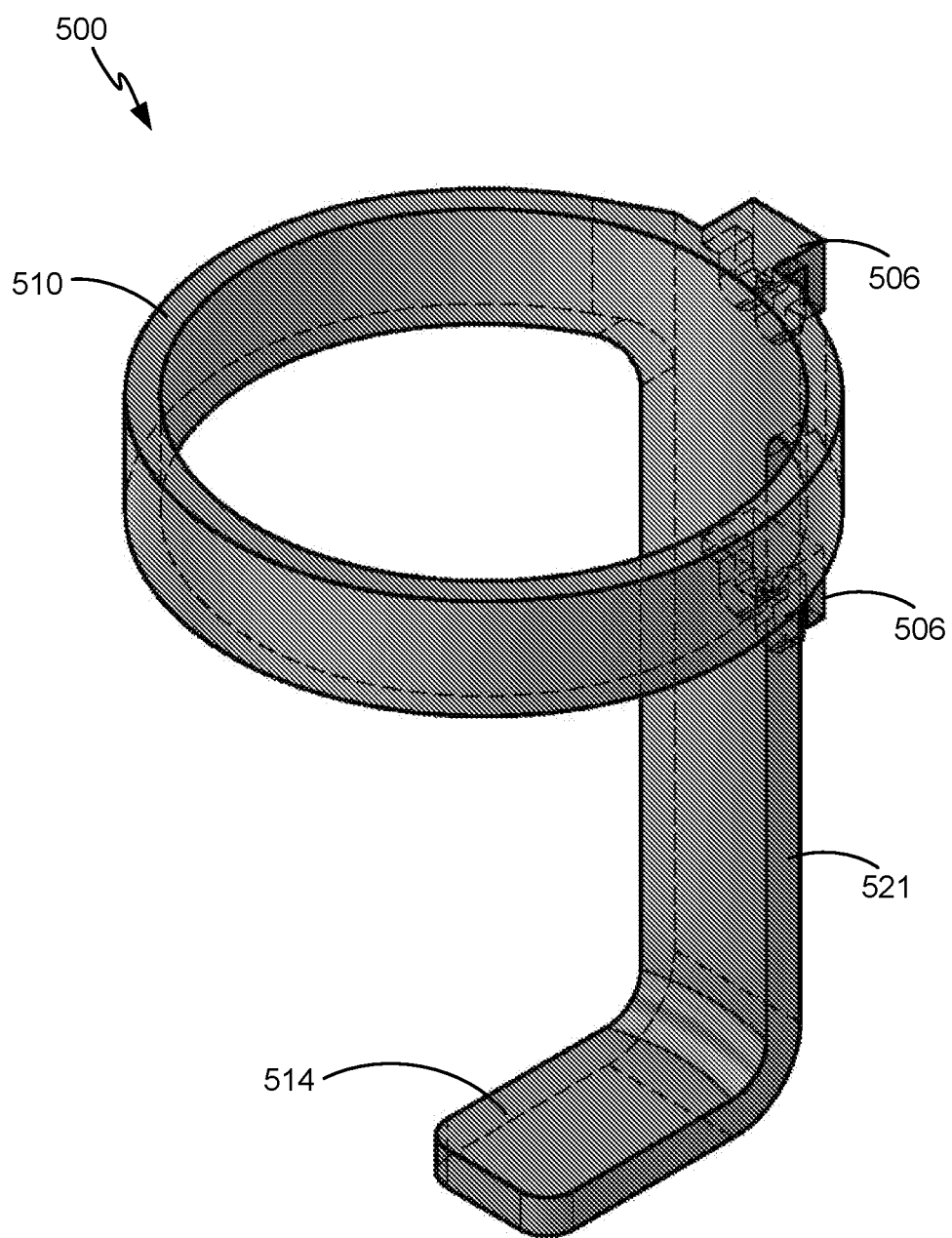
FIGS. 5A-5D illustrate an optional large cup holder accessory for the equipment carrying system of FIGS. 1A-1C.
Figure 5B:
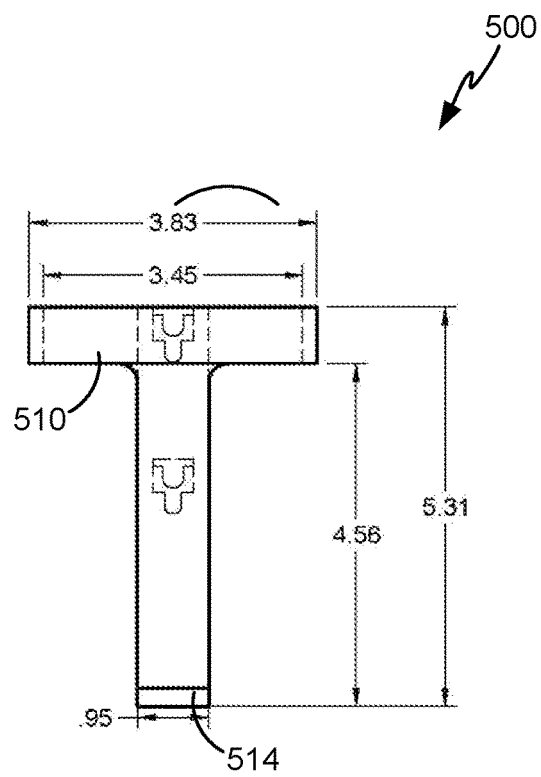
Figure 5C:
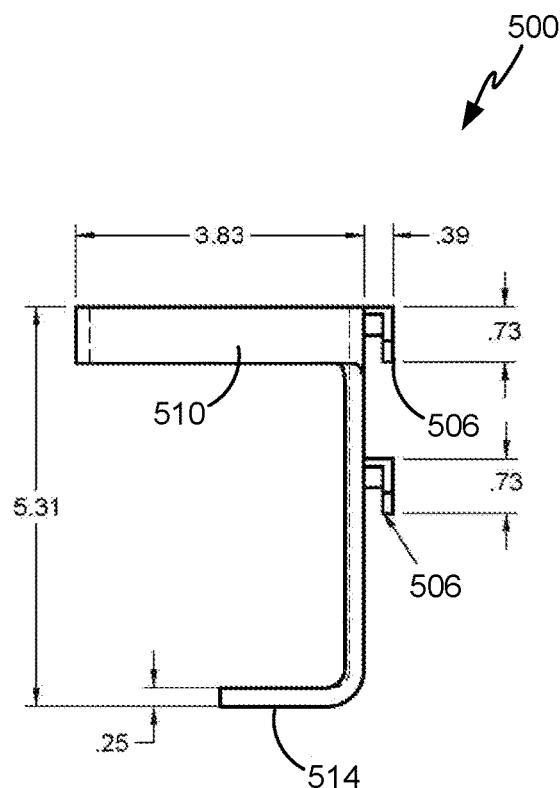
Figure 5D:
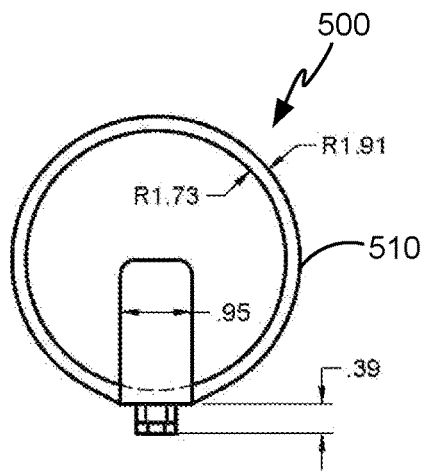

FIGS. 5A-5D illustrate an optional large cup holder accessory 500 for the equipment carrying system 100. Specifically, FIG. 5A illustrates an isometric view, FIG. 5B illustrates a front view, and FIG. 5C illustrates a side view, and FIG. 5D illustrates a bottom view of cup holder 500.

Cup holder 500 is a circular configuration with an open top, circular sidewalls 510, mounting plate 521 and a bottom tab 514. Mating protrusions 506 are configured to engage a set of accessory notches 106 of system 100, allowing a user to mount cup holder 500 to upright members 107 of system 100.

FIGS. 5B-5D include size dimensions in inches of one example, although size may vary considerably, such as between 50 to 200 percent of the dimensions shown on FIGS. 5B-5D. The sizes are adjusted to conform to the system 100, and to fit a suitable beverage container, such as a 20-48 ounce beverage cup and/or mug.

Figure 6A:
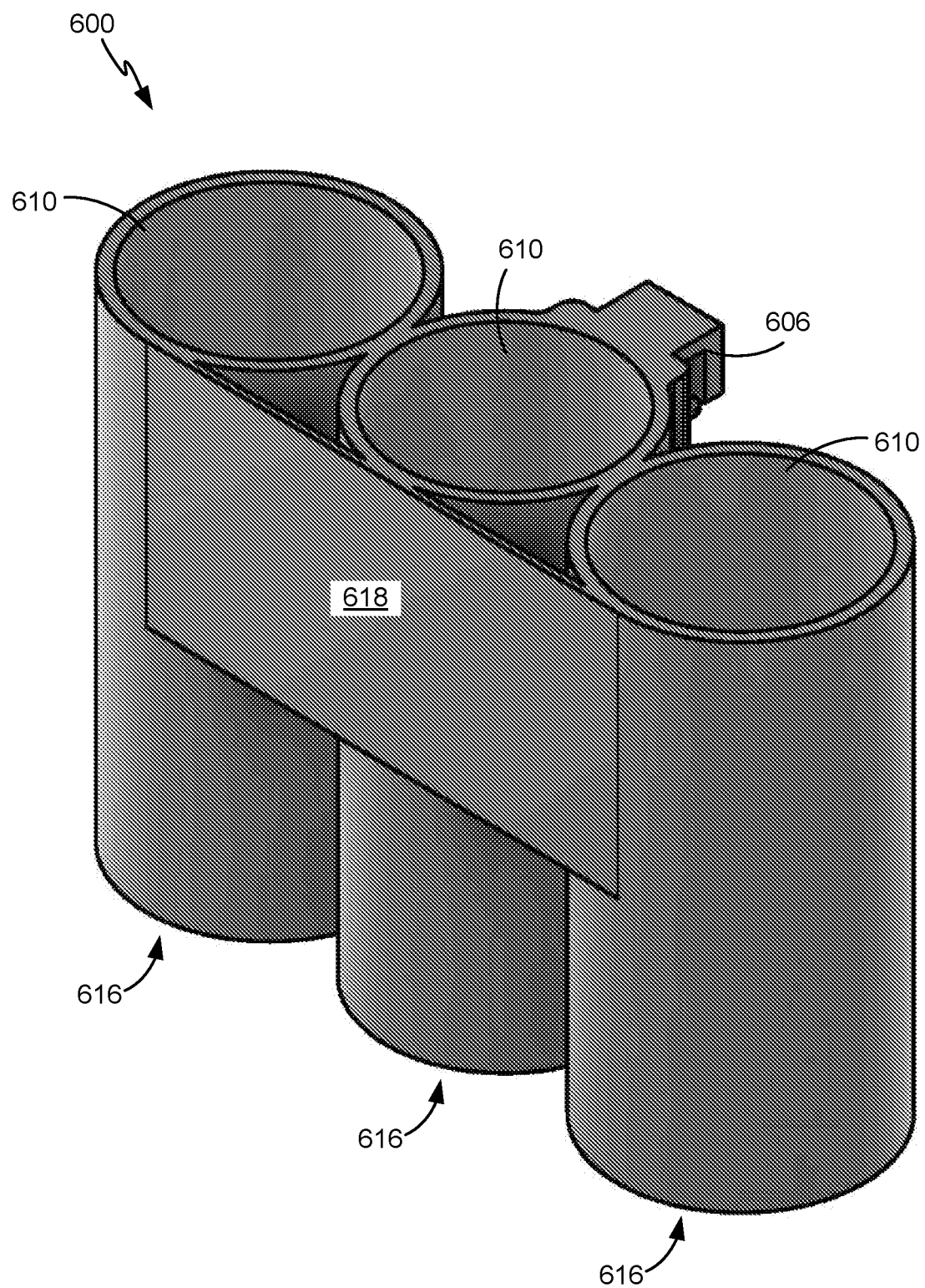
FIGS. 6A-6D illustrate an optional junior sporting equipment carrier accessory for the equipment carrying system of FIGS. 1A-1C.
Figure 6C:
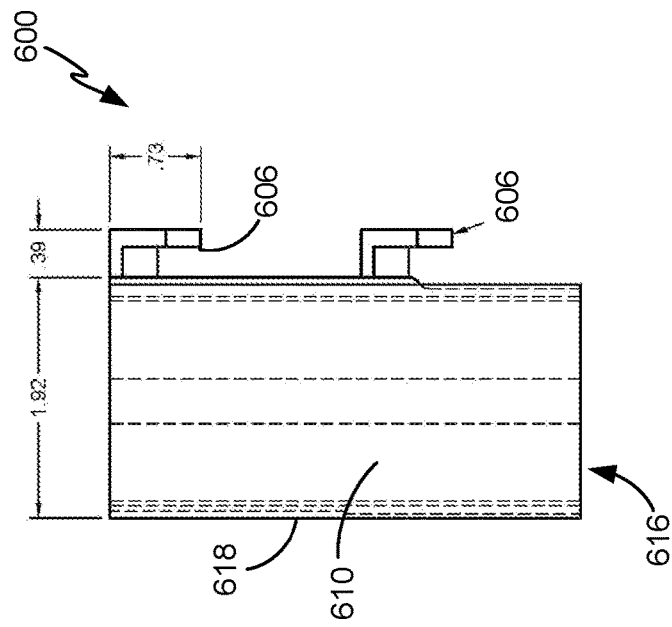
Figure 6B:
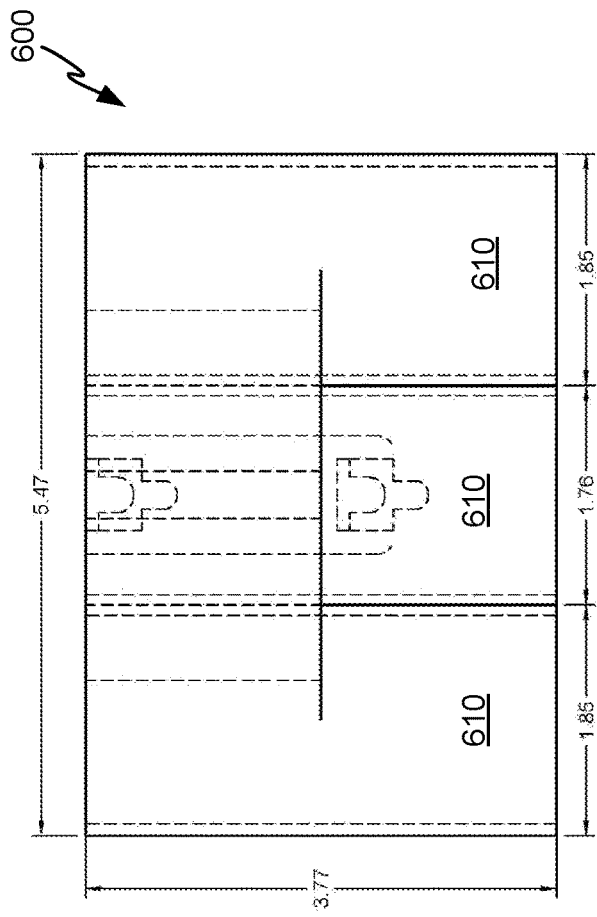
Figure 6D:
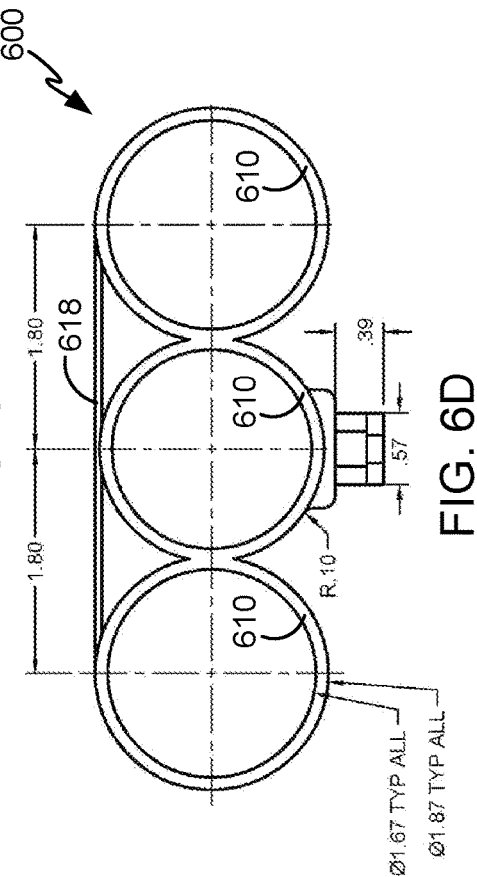

FIGS. 6A-6D illustrate an optional junior sporting equipment carrier accessory 600 for the equipment carrying system 100. Specifically, FIG. 6A illustrates an isometric view, FIG. 6B illustrates a front view, and FIG. 6C illustrates a side view, and FIG. 6D illustrates a bottom view of junior sporting equipment carrier accessory 600.

Junior sporting equipment carrier accessory 600 includes three adjacent interconnected cylinders 610, each with open tops and open bottoms 616. Other examples may include more or less than three adjacent interconnected cylinders 610, such as one to ten adjacent interconnected cylinders 610. A support plate 618 provides additional rigidity between the interconnected cylinders 610.

Mating protrusions 606 are coupled to a backside of the center cylinder 610. Mating protrusions 606 configured to engage a set of accessory notches 106 of system 100, allowing a user to junior sporting equipment carrier accessory 600 to upright members 107 of system 100.

FIGS. 6B-6D include size dimensions in inches of one example, although size may vary considerably, such as between 50 to 200 percent of the dimensions shown on FIGS. 6B-6D. The sizes are adjusted to conform to the system 100, and to fit junior sporting equipment, such as three junior golf clubs. The junior golf clubs supported by junior sporting equipment carrier accessory 600 would preferably be smaller than golf clubs 210 to prevent dragging the handle ends of the junior golf clubs on the ground with system 100 mounted to stroller 230. In other examples, different elongated sporting equipment, such as a putter, a golf ball retriever, and/or an umbrella, each of which may be shorter than other golf clubs 210.

FIGS. 7A-7D illustrate an optional magnetic holder accessory 700 for the equipment carrying system 100.

Figure 7B:
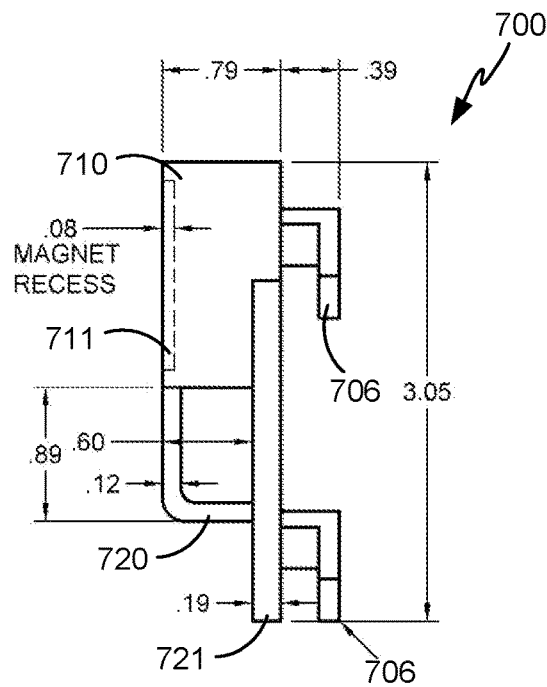
FIGS. 7A-7D illustrate an optional magnetic holder accessory for the equipment carrying system of FIGS. 1A-1C.
Figure 7C:
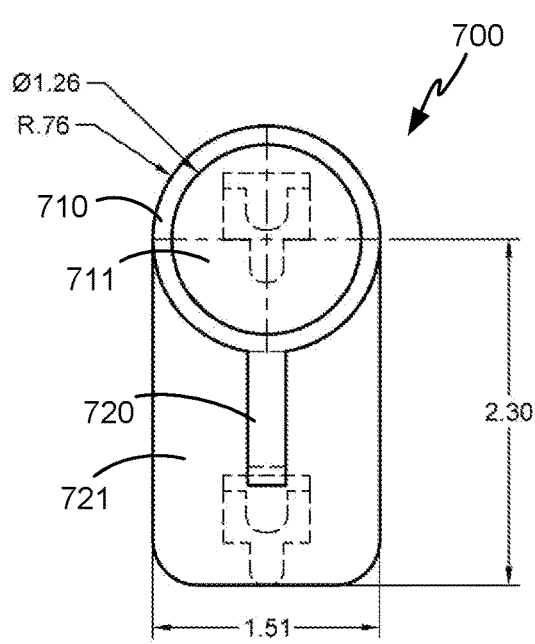
Figure 7D:
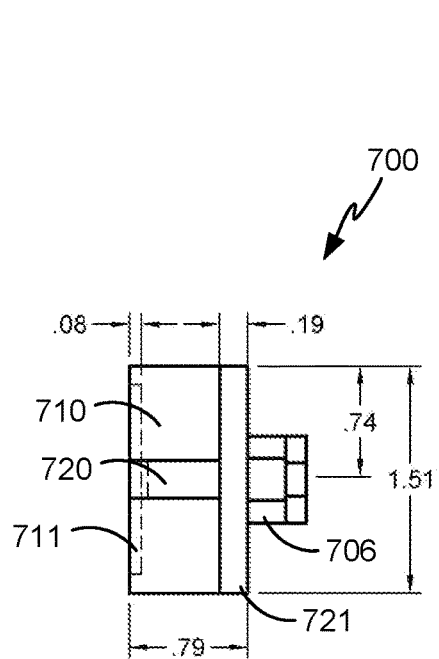
Figure 7A:
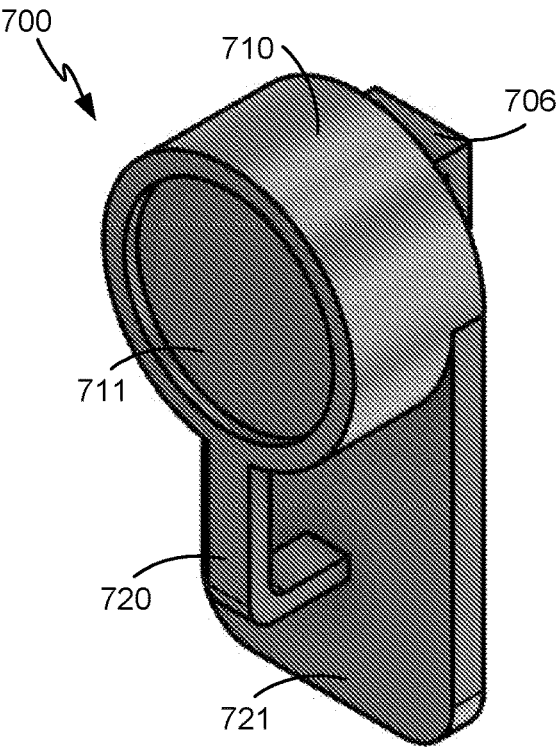

Specifically, FIG. 7A illustrates an isometric view, FIG. 7B illustrates a front view, and FIG. 7C illustrates a side view, and FIG. 7D illustrates a bottom view of magnetic holder 700.

Magnetic holder 700 includes mounting plate 721 with mating protrusions 706. Mating protrusions 706 are configured to engage a set of accessory notches 106 of system 100, allowing a user to mount magnetic holder 700 to upright members 107 of system 100. A permanent magnet 711 is mounted in cylinder 710 opposite the mating protrusions 706. Permanent magnet 711 configured to releasably constrain a ferromagnetic object, such as magnetic golf accessories, such as a towel or range finder with ferromagnetic attachment element, a user's keys, or magnetic cell phone case. In other examples, permanent magnet 711 may be replaced with a steel plate suitable for attaching a magnetic element. Hook 720 provides another mounting location for personal items, keys, and/or club cleaning tools for example using a carabiner or a golf towel ring.

FIGS. 7B-7D include size dimensions in inches of one example, although size may vary considerably, such as between 50 to 200 percent of the dimensions shown on FIGS. 7B-7D. The sizes are adjusted to conform to the system 100.

Figure 8B:
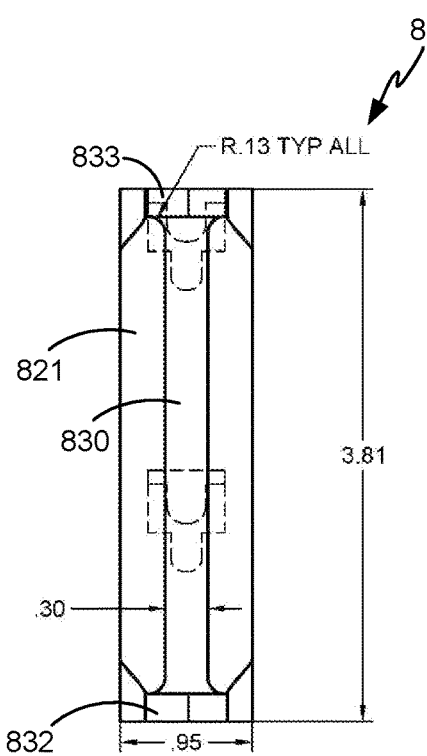
FIGS. 8A-8D illustrate an optional vertical mounting bar accessory for the equipment carrying system of FIGS. 1A-1C.
Figure 8C:
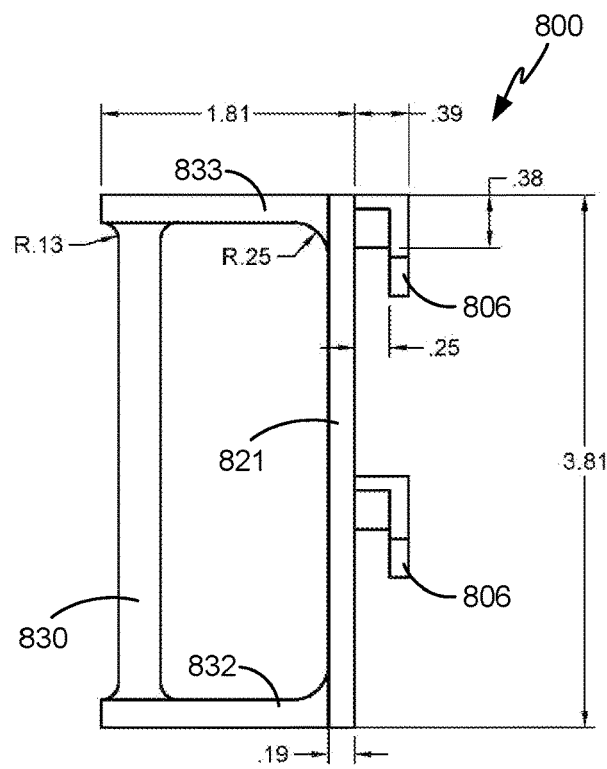
Figure 8D:
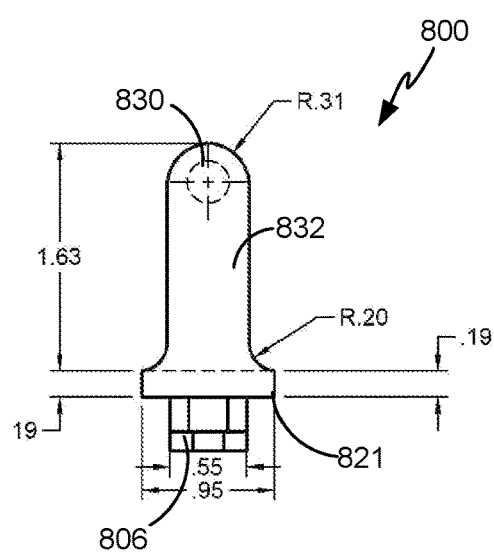
Figure 8A:
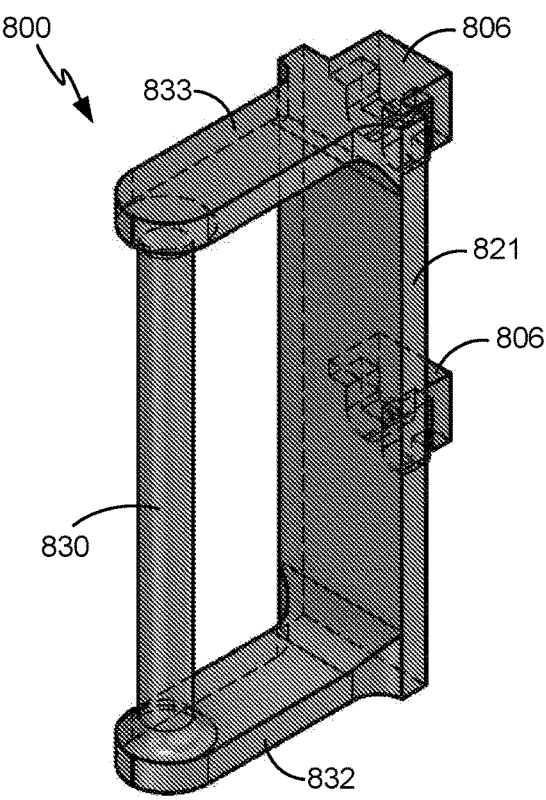

FIGS. 8A-8D illustrate an optional vertical mounting bar accessory 800 for the equipment carrying system 100. Specifically, FIG. 8A illustrates an isometric view, FIG. 8B illustrates a front view, and FIG. 8C illustrates a side view, and FIG. 8D illustrates a bottom view of vertical mounting bar accessory 800.

Vertical mounting bar accessory 800 includes mounting plate 821 with mating protrusions 806. Mating protrusions 806 are configured to engage a set of accessory notches 106 of system 100, allowing a user to vertical mounting bar accessory 800 to upright members 107 of system 100.

Lateral supports 832, 833 extend outward from mounting plate 821 opposite mating protrusions 806. Vertical mounting bar 830 spans lateral supports 832, 833. Vertical mounting bar 830 provides a mounting point for any clamp-on or strap accessory, such as a cell phone holder. Clamp-on or strap accessories have been come prevalent as they may be mounted to a golf alignment stick. Vertical mounting bar 830 is a suitable mounting location for such accessories, which include cell phone holders. In this manner, vertical mounting bar accessory 800 may be combined with a clamp-on cell phone holder to serve as a hands-free camera mount. A user may use the camera mount for video recordings, such as recording golf swings. In other examples, an accessory holder mounted to bar 830 may be used to hold other electronics such as a GPS unit.

FIGS. 8B-8D include size dimensions in inches of one example, although size may vary considerably, such as between 50 to 200 percent of the dimensions shown on FIGS. 8B-8D. The sizes are adjusted to conform to the system 100.

Figure 9A:
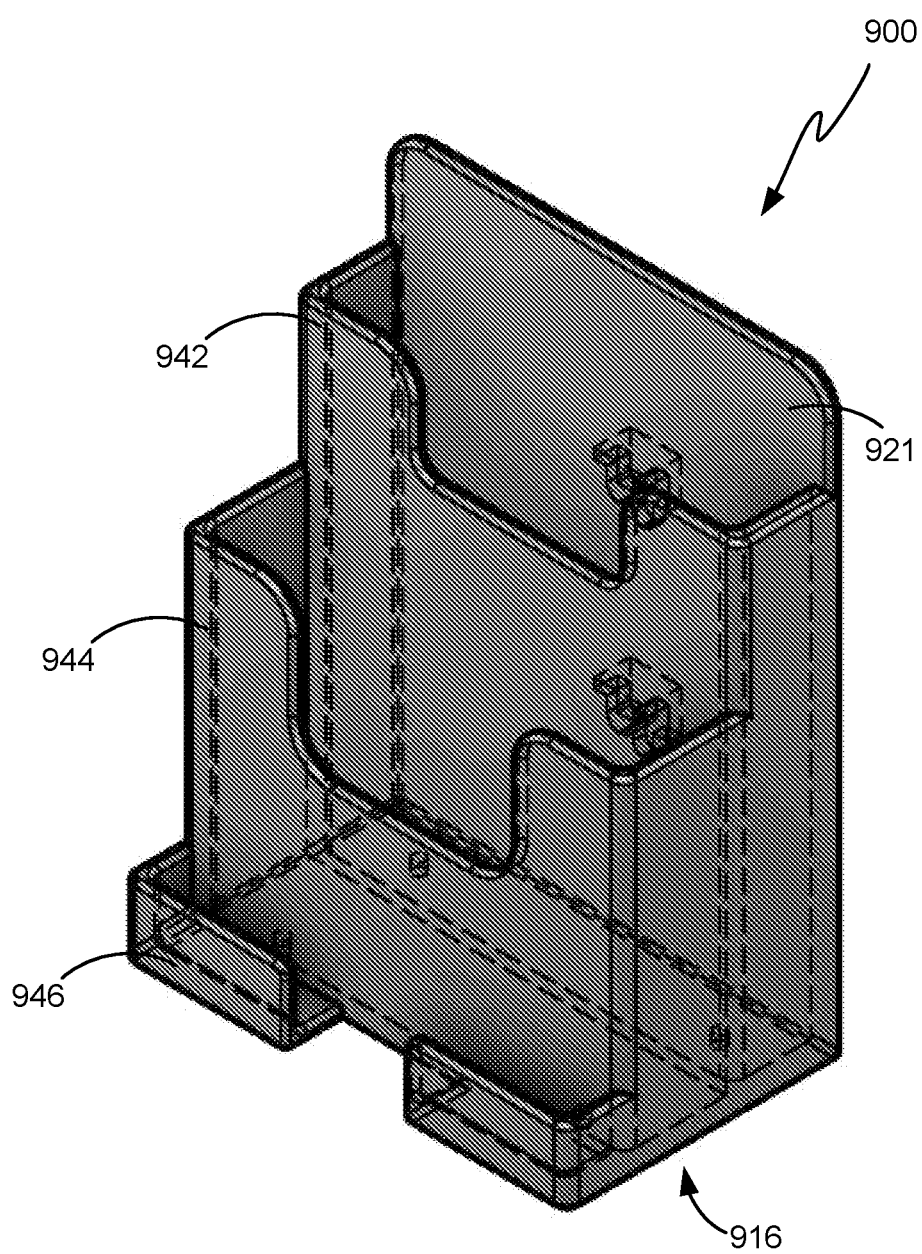
FIGS. 9A-9D illustrate an optional wallet carrier accessory for the equipment carrying system of FIGS. 1A-1C.
Figure 9B:
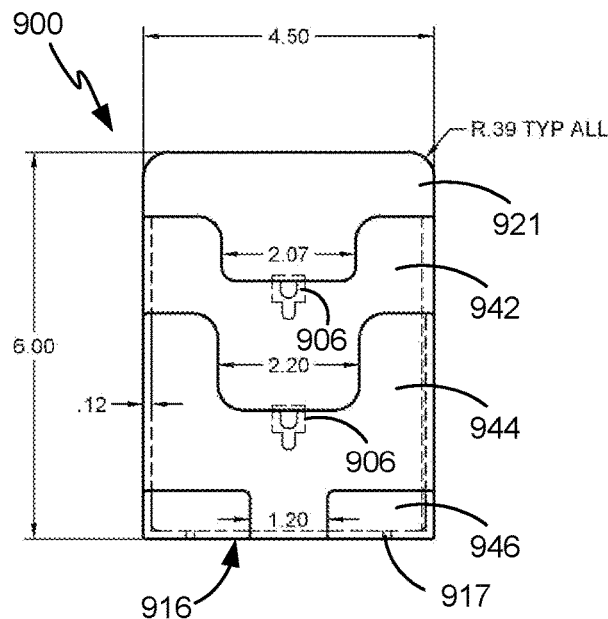
Figure 9C:
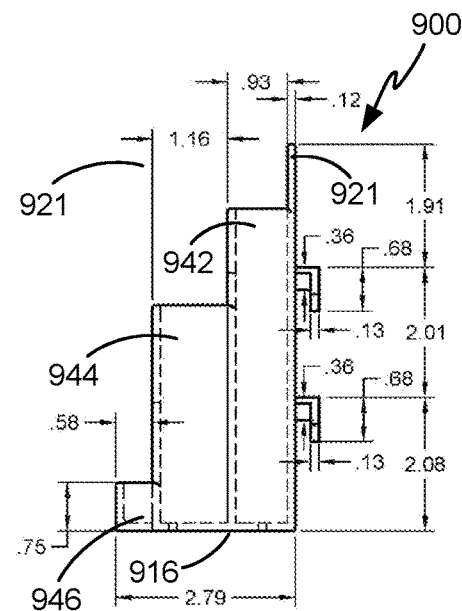
Figure 9D:
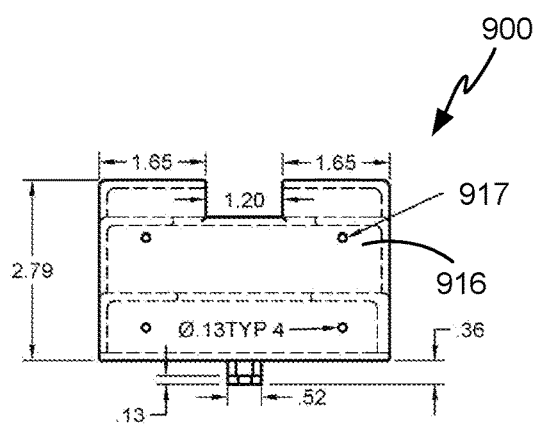

FIGS. 9A-9D illustrate an optional wallet carrier accessory 900 for the equipment carrying system 100. Specifically, FIG. 9A illustrates an isometric view, FIG. 9B illustrates a front view, and FIG. 9C illustrates a side view, and FIG. 9D illustrates a bottom view of wallet carrier 900.

Wallet carrier 900 includes mounting plate 921 with mating protrusions 906. Mating protrusions 906 are configured to engage a set of accessory notches 106 of system 100, allowing a user to mount wallet carrier 900 to upright members 107 of system 100. A first rectangular storage compartment 942 extends outwardly off mounting plate 921 opposite mating protrusions 906. A second rectangular storage compartment 944 extends outwardly off the exterior of first rectangular storage compartment 942 opposite mounting plate 921. A third rectangular storage compartment 946 extends outwardly off the exterior of the second rectangular storage compartment 944 opposite the first rectangular storage compartment 942. Storage compartments 942, 944 and 946 are open at the top and share a common bottom 916 with drain holes 917. Storage compartments 942, 944 and 946 may take any size or shape, and at least on may include an upper opening sized to receive a wallet. In one specific example, storage compartments 942, 944 are configured to receive a phone, scorecard and/or wallet, whereas storage compartments 946 is configured to store and provide easy access to a pencil.

FIGS. 9B-9D include size dimensions in inches of one example, although size may vary considerably, such as between 50 to 200 percent of the dimensions shown on FIGS. 9B-9D. The sizes are adjusted to conform to the system 100.

The specific techniques for stroller organizational system for carrying athletic equipment, including techniques described with respect to system 100 and assembly 200 are merely illustrative of the general inventive concepts included in this disclosure as defined by the following claims.

What is claimed is:

1. An equipment carrying system comprising:
 a first upright member;
 one or more hanging mounts coupled to an upper portion of the first upright member, the one or more hanging mounts being configured for hanging attachment to a bar;
 a second upright member with the one or more hanging mounts also extending from an upper portion of the second upright member;
 a first lateral support member extending from the first upright member below the hanging mounts, the first lateral support member including a series of protrusions extending towards the hanging mounts with spaces therebetween, each of the spaces being configured to support one side of individual items of a set of elongated sporting equipment,
 wherein the first lateral support member extends between the first upright member and the second upright member; and
 a second lateral support member extending between the first upright member and the second upright member below the hanging mounts and above the first lateral support member,
 wherein the second lateral support member includes a second series of protrusions extending towards the hanging mounts with spaces therebetween, each of the spaces of the second lateral support member being configured to support one side of other individual items of the set of elongated sporting equipment.

2. The equipment carrying system of claim 1, wherein the equipment carrying system including the first upright member, the one or more hanging mounts, and the lateral support member is a unitary component.

3. The equipment carrying system of claim 2, wherein the unitary component is a molded polymer component.

4. The equipment carrying system of claim 1, wherein the equipment carrying system is formed from a material selected from a group consisting of:
 a polyethylene terephthalate glycol;
 a polymer;
 an acrylonitrile butadiene styrene (ABS);

a polycarbonate;
a carbon fiber;
aluminum; and
an aluminum alloy.

5. The equipment carrying system of claim 1,
wherein the first upright member includes a first slot formed proximate to an upper end of the first upright member, the first slot being configured to receive a first strap to secure the first upright member to the bar, and
wherein the second upright member includes a second slot formed proximate to an upper end of the second upright member, the second slot being configured to receive a second strap to secure the second upright member to the bar.

6. The equipment carrying system of claim 5, further comprising straps extending through the first slot and the second slot, wherein the straps are configured to form a loop over the bar to attach the equipment carrying system to the bar.

7. The equipment carrying system of claim 5,
wherein the first upright member is shaped as a generally planar elongated member with a first end of the lateral support member intersecting with a first planar surface of the first upright member, and
wherein the second upright member is shaped as a generally planar elongated member with a second end of the lateral support member intersecting with a second planar surface of the second upright member.

8. The equipment carrying system of claim 5, further comprising a set of accessory notches formed in at least one of the first upright member and the second upright member.

9. An assembly comprising:
a stroller including: a stroller frame with wheels, a generally horizontal stroller handle connected to the stroller frame, a child seat suspended from the stroller frame, and an open storage compartment suspended from the stroller frame below the child seat; and
the equipment carrying system of claim 1,
wherein the one or more hanging mounts are supported by the stroller handle such that the stroller handle functions as the bar and the equipment carrying system hangs from the stroller handle.

10. The assembly of claim 9, further comprising the set of elongated sporting equipment with one side of each of the individual items of the set of elongated sporting equipment being supported by the spaces and the other side of each of the individual items of the set of elongated sporting equipment being supported by the open storage compartment.

11. The assembly of claim 9, further comprising at least one counterweight attached to the stroller frame opposite the stroller handle, the at least one counterweight include a mass of at least 1 pound and a releasable strap engaging the stroller frame.

12. The equipment carrying system of claim 1, wherein the one or more hanging mounts include one or more hooks coupled to the upper portion of the upright member, the one or more hooks being configured to hang over the bar.

13. The equipment carrying system of claim 1, wherein the one or more hanging mounts include:
a first slot formed in the upper portion of the first upright member;
a first strap to extend through the first slot and secure the first upright member to the bar;
a second slot formed in the upper portion of the second upright member; and
a second strap configured to extend through the second slot and secure the second upright member to the bar.

14. An equipment carrying system comprising:
a first upright member:
one or more hanging mounts coupled to an upper portion of the first upright member, the one or more hanging mounts being configured for hanging attachment to a bar;
a second upright member with the one or more hanging mounts also extending from an upper portion of the second upright member;
a lateral support member extending from the first upright member below the hanging mounts, the lateral support member including a series of protrusions extending towards the hanging mounts with spaces therebetween, each of the spaces being configured to support one side of individual items of a set of elongated sporting equipment,
wherein the lateral support member extends between the first upright member and the second upright member;
a first carrier extending laterally from the first upright member and coupling a first hanging mount of the hanging mounts to the first upright member; and
a second carrier extending laterally from the second upright member and coupling a second hanging mount of the hanging mounts to the second upright member.

15. The equipment carrying system of claim 14,
wherein the one or more hanging mounts include one or more hooks coupled to the upper portion of the first upright member, the one or more hooks being configured to hang over the bar, and
wherein the first carrier and the second carrier form slots configured to receive a strap to secure the hooks over the horizontal bar.

16. The equipment carrying system of claim 15, further comprising straps extending through the slots, wherein the straps are configured to form a loop over the horizontal bar to prevent the hanging mounts from disengaging the horizontal bar.

17. The equipment carrying system of claim 14,
wherein the first upright member is shaped as a generally planar elongated member extending between the lateral support member and the first carrier with a first end of the lateral support member intersecting with a first planar surface of the first upright member, and
wherein the second upright member is shaped as a generally planar elongated member extending between the lateral support member and the second carrier with a second end of the lateral support member intersecting with a second planar surface of the second upright member.

18. The equipment carrying system of claim 17, further comprising:
a first sidewall support between the first carrier and the first upright member, the first sidewall support opposite the first hanging mount relative to the first carrier; and
a second sidewall support between the second carrier and the second upright member, the second sidewall support opposite the second hanging mount relative to the second carrier.

19. The equipment carrying system of claim 14, further comprising through holes in at least one of the first carrier and the second carrier, the through holes sized to receive golf tees.

20. The equipment carrying system of claim 14, wherein the one or more hanging mounts include:
a first slot formed in the upper portion of the first upright member;

a first strap to extend through the first slot and secure the first upright member to the bar;

a second slot formed in the upper portion of the second upright member; and a second strap configured to extend through the second slot and secure the second upright member to the bar.

21. An equipment carrying system comprising:

a first upright member;

one or more hanging mounts coupled to an upper portion of the first upright member, the one or more hanging mounts being configured for hanging attachment to a bar;

a second upright member with the one or more hanging mounts also extending from an upper portion of the second upright member;

a lateral support member extending from the first upright member below the hanging mounts, the lateral support member including a series of protrusions extending towards the hanging mounts with spaces therebetween, each of the spaces being configured to support one side of individual items of a set of elongated sporting equipment, wherein the lateral support member extends between the first upright member and the second upright member; and an elongated element below the lateral support member forming a channel sized to receive golf balls, with an open side of the channel facing toward the lateral support member.

22. The equipment carrying system of claim 21, wherein the elongated element includes a snap-in ridge on an upper edge of the channel to releasably constrain golf balls within the channel.

23. The equipment carrying system of claim 21, wherein the one or more hanging mounts include:

a first slot formed in the upper portion of the first upright member;

a first strap to extend through the first slot and secure the first upright member to the bar;

a second slot formed in the upper portion of the second upright member; and a second strap configured to extend through the second slot and secure the second upright member to the bar.

24. An equipment carrying system comprising:

a first upright member;

one or more hanging mounts coupled to an upper portion of the first upright member, the one or more hanging mounts being configured for hanging attachment to a bar;

a second upright member with the one or more hanging mounts also extending from an upper portion of the second upright member;

a lateral support member extending from the first upright member below the hanging mounts, the lateral support member including a series of protrusions extending towards the hanging mounts with spaces therebetween, each of the spaces being configured to support one side of individual items of a set of elongated sporting equipment, wherein the lateral support member extends between the first upright member and the second upright member; and a set of accessory notches formed in at least one of the first upright member and the second upright member.

25. The equipment carrying system of claim 24, further comprising an accessory include mating protrusions engages with the set of accessory notches, wherein the accessory is selected from a group consisting of:

a cup holder including a circular opening and a bottom cup support;

a set of tubes configured to receive junior sporting equipment;

a magnetic holder;

a phone clip; and a rectangular compartment with an upper opening sized to receive a wallet.

26. The equipment carrying system of claim 24, wherein the set of accessory notches include through holes spaced apart from one another in vertical alignment on the one of the first upright member and the second upright member.

27. The equipment carrying system of claim 24, wherein the one or more hanging mounts include:

a first slot formed in the upper portion of the first upright member;

a first strap to extend through the first slot and secure the first upright member to the bar;

a second slot formed in the upper portion of the second upright member; and a second strap configured to extend through the second slot and secure the second upright member to the bar.

* * * * *